May 19, 1953

H. D. FORSE ET AL 2,639,065

SHIRT FOLDING APPARATUS

Filed June 2, 1947

HARRY D. FORSE
WILLIAM P. THOMPSON
LEON T. HOOPER
INVENTORS.

BY Leon T. Hooper

ATTORNEY

May 19, 1953  H. D. FORSE ET AL  2,639,065
SHIRT FOLDING APPARATUS
Filed June 2, 1947  6 Sheets-Sheet 3

HARRY D. FORSE
WILLIAM P. THOMPSON
LEON T. HOOPER
INVENTORS

BY Leon T. Hooper

ATTORNEY

HARRY D. FORSE
WILLIAM P. THOMPSON
LEON T. HOOPER
INVENTORS.

BY Leon T. Hooper
ATTORNEY

UNITED STATES PATENT OFFICE 2,639,065

SHIRT FOLDING APPARATUS

Harry D. Forse, William P. Thompson, and Leon T. Hooper, Anderson, Ind.; said Thompson and said Hooper assignors to Forse Corporation, Anderson, Ind., a corporation of Delaware Application June 2, 1947, Serial No. 751,884

2 Claims. (Cl. 223—37)

This invention relates to improvements in shirt folding apparatus and is especially adapted for use in shirt manufacturing plants, commercial laundries and other shirt handling establishments. However employment of improved folding apparatus of this invention may be extended to other fields and also to garments and materials other than shirts.

Shirt manufacturers and commercial laundries, and the like, have long desired an efficient folding device in which centering and alignment of the garment to be folded were not entirely dependent upon the visual keenness of an operator and also a device in which automatic operation reduced manual labor to a minimum. In substantially all shirt folding devices presently available, the shirts are placed bosom down up the folding device at the beginning of the folding operation. Inasmuch as the button and button hole strips, which are used for centering, are in this position concealed from the operator centering or aligning is a haphazard affair. Moreover in order that the button and button hole strips of the folded shirt be positioned in proper alignment it is customary or necessary that they be buttoned or otherwise fastened together before the folding operation is started. This is a time consuming operation requiring both skill and special equipment.

Therefore one of the chief objects of importance of the present invention is the provision of means for mechanically folding a shirt or similar garment with the bosom or button portion thereof uppermost to thereby facilitate the proper centering and aligning of the garment preparatory to folding.

Still another and further object of advantage and importance is the provision of means for clamping and maintaining the collar and bosom portions of a shirt in properly centered positions during the folding operation. Furthermore the shirt may be maintained in proper folding position regardless of whether or not the collar and bosom portions are buttoned or unbuttoned.

A further object of advantage and importance resides in the provision of means for exerting an expanding pressure on the interior of the clamped collar throughout the folding operation. Moreover the collar expanding and collar clamping means are locked against return movement.

Another object of importance is the provision of means for folding the sleeves and side portions of a shirt rearwardly whereby the collar and bosom portions thereof may be visually inspected at any time during the folding operation. Additionally the folding mechanism is timed so that the operable movement of one folding vane in a given direction leads the movement of the other folding vane. And upon operable movement in the opposite direction the operating sequence of the folding vanes is reversed.

Still another object of advantage and importance is the provision of means for clamping the sleeves of the shirt being folded against the side portions thereof preparatory to folding and of automatically releasing the clamping means upon movement of the folding vanes to folded position.

Another object of importance and advantage is the provision of means for automatically tilting the shirt carrying portion of the device as the side folding portion of the operation is completed. The tilting movement functions to release certain of the holding clamps and positions the shirt to receive a binder, envelope, or other packaging element.

An additional object of advantage and importance resides in the provision of means for automatically tilting the collar and yoke supporting portion of the device relative to the shirt supporting panel upon the return movement of the shirt carrying portion of the device. Additionally this return movement also functions to operate means to cause the folding vanes to be returned to shirt receiving positions.

Additional objects of advantage and importance will become apparent as the following detailed description progresses, reference being had to the accompanying drawings, wherein.

Figure 1:
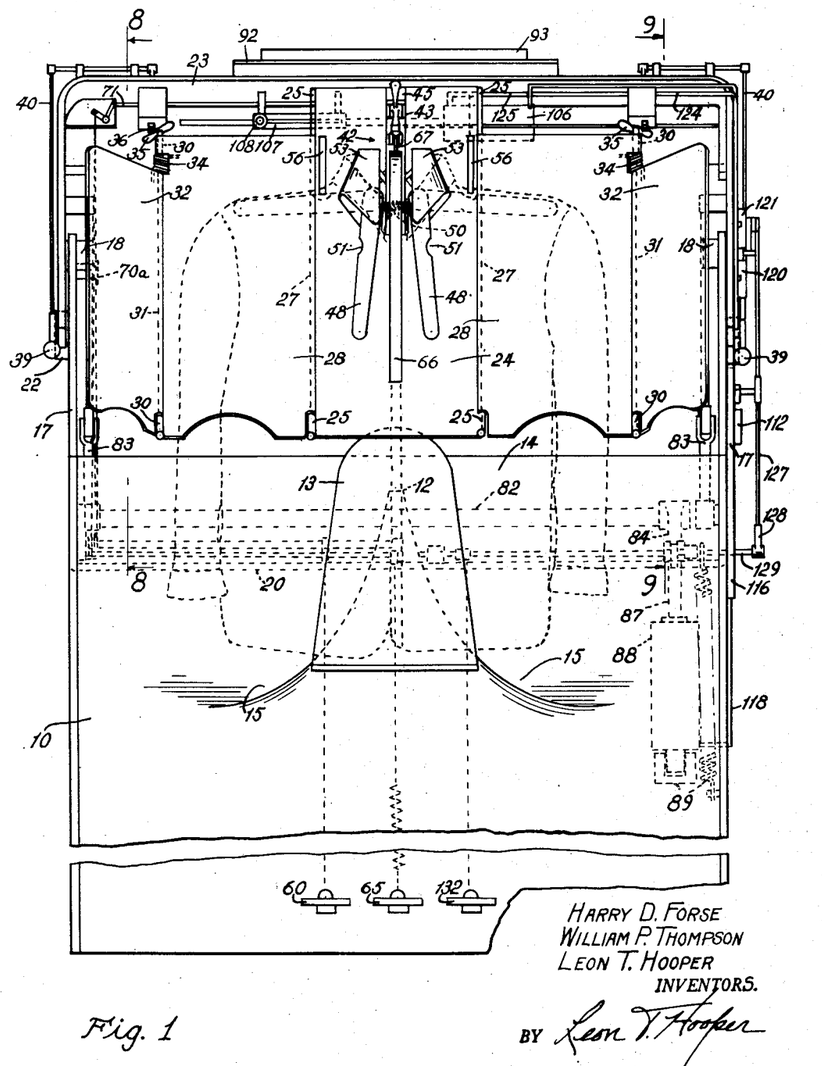
Figure 1 is a front elevational view of a shirt folding apparatus which embodies the invention, portions thereof being broken away.

As is best shown in Figure 1, the reference numeral 10 indicates generally the body or base of the improved apparatus of this invention. In the illustrated embodiment the base 10 comprises a hollow member within which various operating mechanisms, later to be described, may be housed. The base 10 has a forward portion extending upwardly and rearwardly, see Figure 2, to form a support 12 for a guide panel 13. The guide panel 13 may be hinged, but is preferably biased toward the support 12 for purposes hereinafter more fully disclosed. The portion of the body 10 to the rear of the panel supporting element 12 is formed to provide an apron 14 to partially enclose and shield the operating elements within the body. The portion of the body intermediate the panel support 12 and the apron 14 is preferably concaved 15 to provide clearance for the shirt folding operation.

Extending upwardly from opposed sides of the body 10, as best shown in Figure 1, are supporting elements 17 which carry bearings 18 closely adjacent the upper ends thereof. Where it is so desired the lower portions of the supporting elements 17 may be turned inwardly, as shown in dotted lines in Figure 1, and joined to provide a shelf 20 upon which bearings and the like may be supported.

Figure 8:
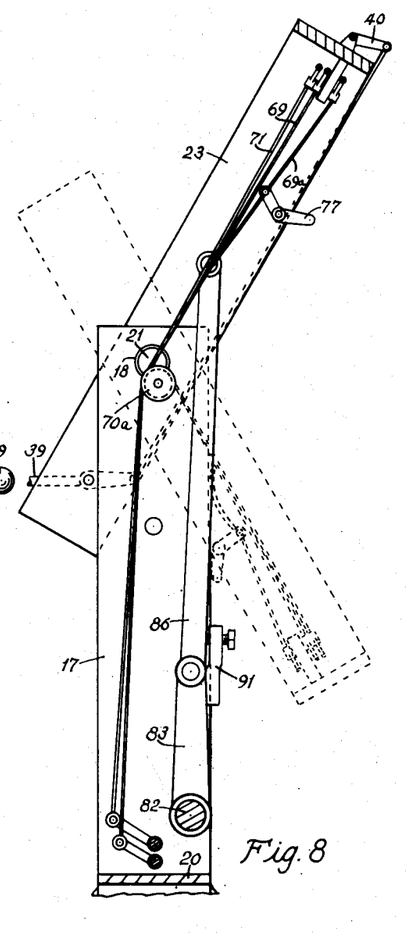
Figure 8 is a vertical section taken on line 8—8 of Figure 1 looking in the direction indicated by the arrows, portions thereof being omitted to show underlying parts.
Figure 9:
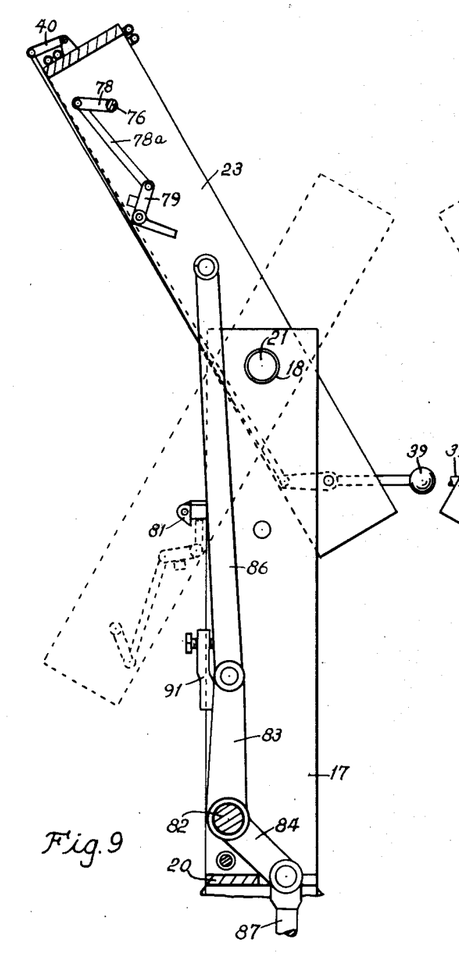
Figure 9 is a similar sectional view taken on line 9—9 of Figure 1.

Pivotally mounted in the bearings 18, as by stub shafts 21, see Figures 8 and 9, is a U-shaped member 23, to the central portion of the closed end of which a shirt supporting panel 24 is affixed. The U-shaped member is rotatable on the shafts 21 relative to the supporting elements 17, and the supporting elements 17 carry suitable abutments 22 for limiting this rotational movement. Edge portions of the panel 24 are curled upon themselves to provide bearings 25 in which operating rods 27 are journaled. The operating rods 27 extend through the U-shaped member and therebeyond as hereinafter more fully disclosed.

Figure 10:
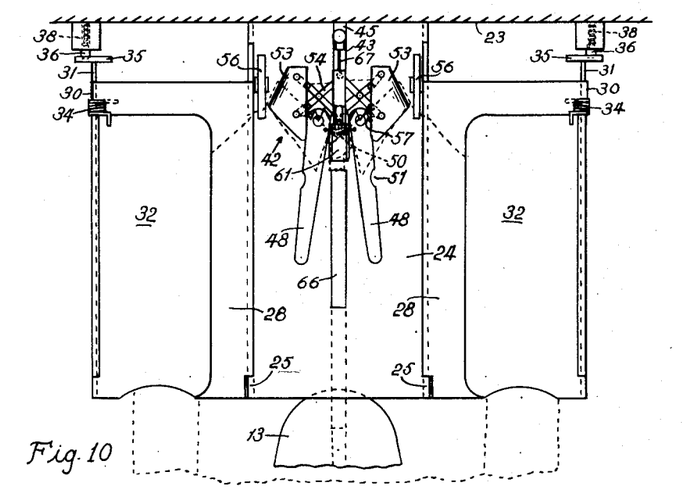
Figure 10 is a top plan view of the shirt supporting and folding elements, portions of the adjacent structure being broken away.
Figures 11, 12:
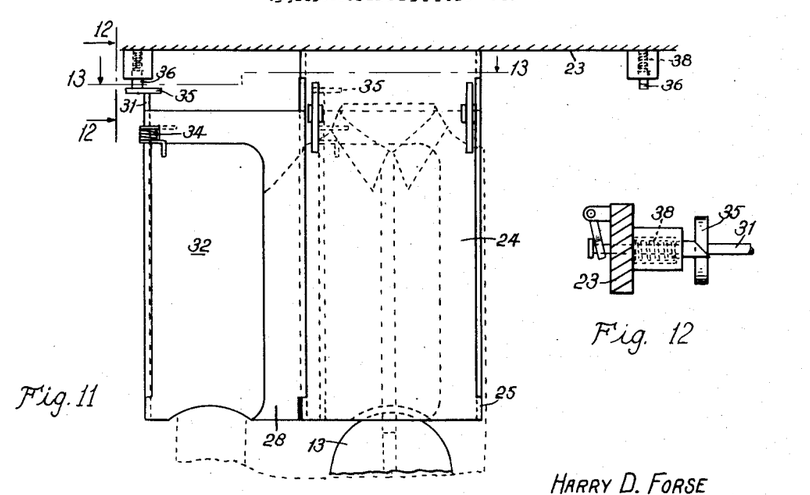
Figure 11 is a view of similar parts in different operative positions.
Figure 12 is a slightly enlarged view of the sleeve clamp operating mechanism taken on line 12—12 of Figure 11, looking in the direction indicated by the arrows.
Figure 13:
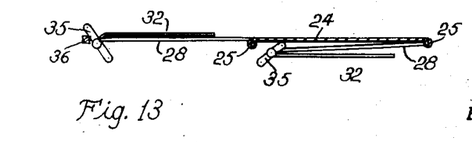
Figure 13 is a sectional view taken on line 13—13 of Figure 11, looking in the direction indicated by the arrows.

Secured to each operating rod 27 and extending laterally therefrom is a folding vane 28 which is rotatable relative to the supporting panel 24. Operable rotation of the vanes 28 is between a first limit position, wherein they lie in the plane of the panel 24, as shown in Figures 1 and 10, and a second limit position wherein the vanes 28 are substantially parallel to and slightly spaced from the reverse side of the panel 24. See Figures 11 and 13. The free end of each folding vane 28 carries a pair of bearings 30 into which hinge rods 31 are journaled. Affixed to each hinge rod 31 and extending radially therefrom is a clamping vane 32 which is biased toward its associated folding vane by a spring 34. Each clamping vane 32 is rotatable with its associated hinge rod 31.

Figure 2:
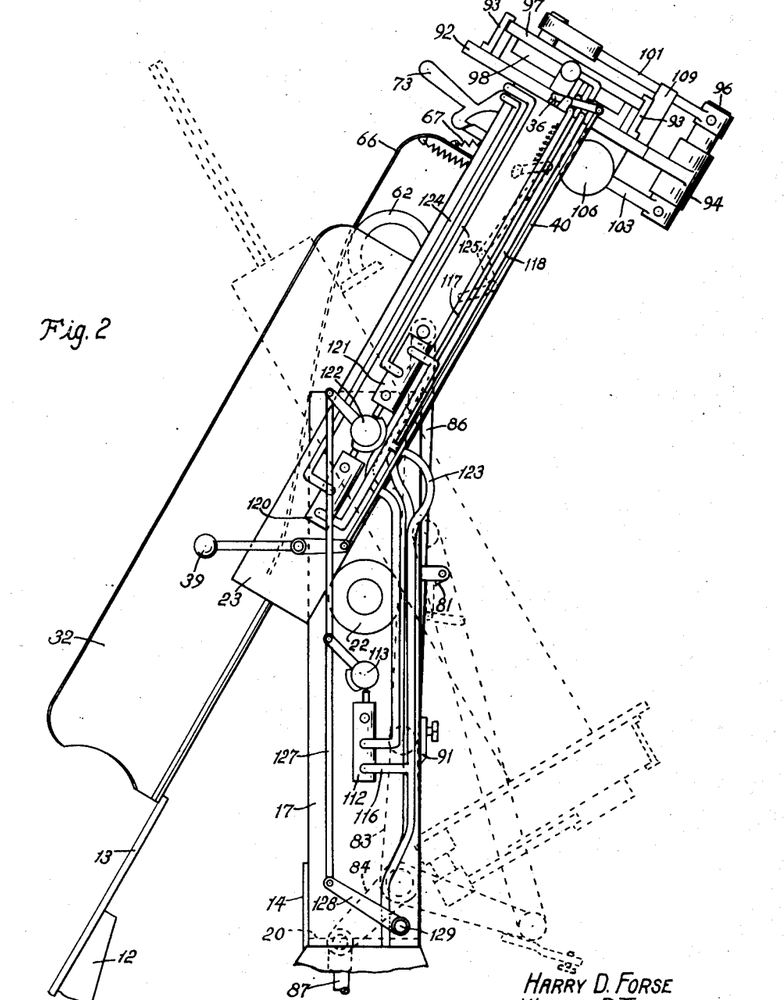
Figure 2 is a side elevational view, slightly enlarged, of the upper portion of the structure shown in Figure 1.

Fixed to the upper end of each hinge rod 31 is a transversely positioned operating arm 35. Each arm 35 is rotatable with the hinge rod 31 and the clamping vane 32 affixed thereto. One end of the transversely positioned arm 35 functions upon engagement with the bottom surface of the panel 24 to rotate the rod 31 and clamping vane 32 a limited distance in opening direction, see Figure 13, and the other end of the arm functions upon engagement with a detent 36 to rotate the rod 31 and clamping vane 32 associated therewith to its full open position as shown in Figures 1 and 2. The detent 36 which is biased toward extended position by spring means 38, see Figure 12, may be retracted by manual operation of an operating handle 39 which through linkage 40 is operably connected therewith. Upon the opening movement of a folding vane 28 the arm 35 engages the detent 36 to thereby rotate the clamping vane 32 associated therewith to the position in which it is shown in Figures 1 and 2. The clamping vane 32 is maintained in this position by the extended detent 36. Upon retraction of the detent 36, as by operation of the handle 39, the arm 35 is rotated by energy stored in the spring 34 thereby moving the vane into clamping position. See Figures 10, 11 and 13. From an inspection of Figures 12 and 13, it will be apparent that rotational movement of a folding vane 28 toward its second limit position will bring the arm 35 into engagement with the inclined end portion of the detent 36. This engagement retracts the detent 36 and permits the arm 35 to pass.

Figure 14:
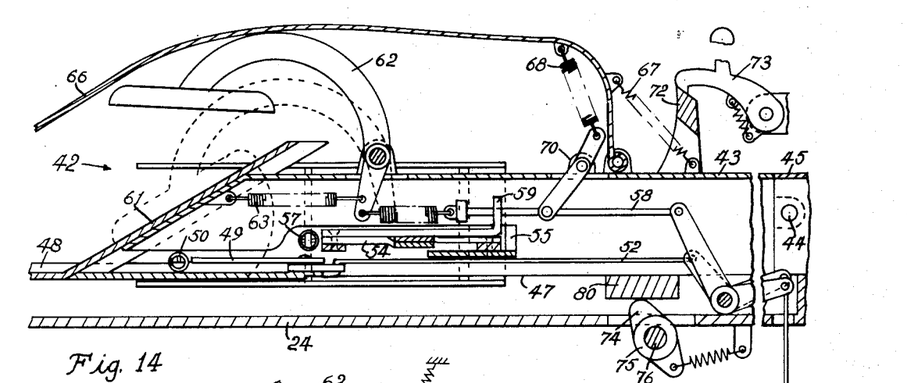
Figure 14 is a slightly enlarged longitudinal section of a portion of the shirt supporting member and associated parts.
Figure 15:
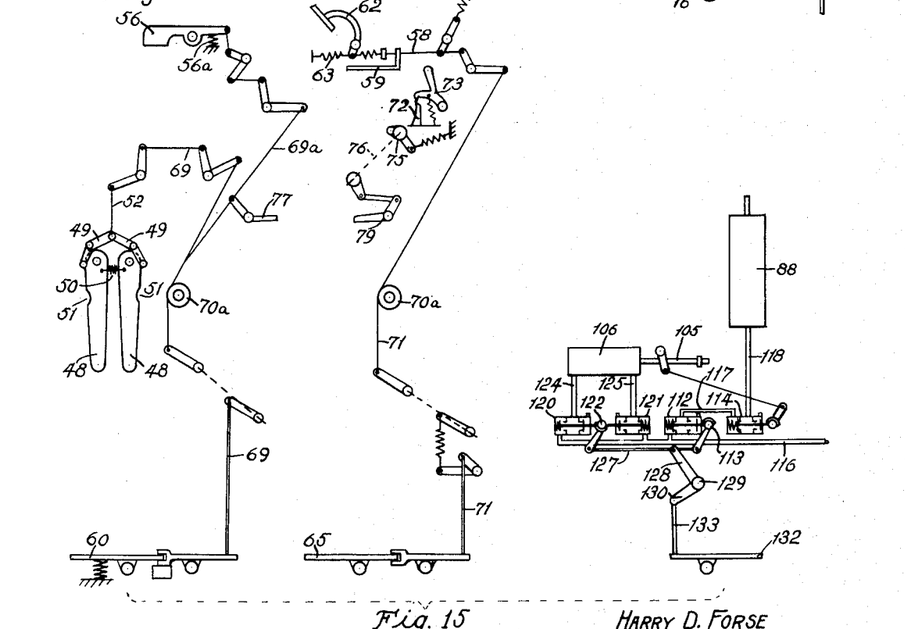
Figure 15 diagrammatically illustrates the association of the various operating elements with the operation initiating members.

Operably positioned on the panel 24 and extending longitudinally thereof as is best shown in Figures 1 and 10 is a shirt alignment and clamping unit indicated in its entirety by the reference numeral 42. This unit 42 comprises a hollow member 43, having an open lower portion and hinged as at 44 to an anchorage 45. The lower edge 47 of the hollow member 43 is spaced from and normally parallels the surface of the panel 24, as is best shown in Figure 14. The shirt alignment unit 42 comprises a pair of pivotally mounted arms 48 which are joined by connecting links 49 for operation in unison. Spring means 50 normally constrain the arms 48 to the substantially parallel position in which they are shown in Figures 1 and 15, and a single operating cable 52 attached to the connecting links 49 functions to move the arm 48 to the dotted line positions in which they are shown in Figure 1. It is to be noted that the arms 48 are provided with clamp receiving notches 51 in order that yoke clamps 56 may function to secure a shirt in folding position when the arms are expanded.

A collar expanding unit comprising forming elements 53 positioned on opposed sides of the hollow member 43 are joined by a multiple toggle link 54 extending through apertures 55 in opposite sides of the hollow member 43. As is best shown in Figures 1, 14 and 15, the forming elements 53 are constrained to contracted position by a spring 57, and are movable to expanded position by a cable or rod 58. As shown in Figures 14 and 15, the rod 58 has a lost motion connection with an attaching arm 59 extending from the multiple toggle 54. Consequently operable movement of the arm 59 to the right, as illustrated in Figures 14 and 15 lags operable movement of the rod 58 in the same direction as hereinafter more fully explained.

An inclined member 61 attached to the hollow member 43 intermediate the collar forming elements 53 provides an anvil or abutment for a collar clamp 62 operably mounted on the hollow member 43 as is best shown in Figure 14. The collar clamp 62, which is biased to open position by spring 63, is arranged through the lost motion connection to operate in sequential relation to the operation of the collar forming elements 53 to insure the proper securing of the front of the collar prior to and during the operable expansion or contraction of the collar forming elements 53. A spring 64 provides for the over travel of the rod 58 and therefore movement of the forming elements 53 may continue after the clamp 68 engages its anvil 61. It is to be noted that upon opening movement of the collar clamp 62 that member functions as a cam and raises a bosom clamp 66 located in its path of travel.

The cable 52 and the rod 58 are preferably connected to treadles 60 and 65, respectively, through a plurality of bell cranks, crank arms and cables, collectively designated by the reference numerals 69 and 71, respectively, and best shown in their entirety in the diagrammatic illustration in Figure 15. The cables 69 and 71 are passed over a double sheave 70a which is located on one of the supports 17 adjacent a bearing 18 so that an involute arc described by the free ends thereof is substantially the same as a regular arc described by the arms of the bell cranks to which the cables are attached when the U-shaped member is rotated on the stub shafts 21. Consequently the operating cables are maintained substantially taut during the tilting operation whereby accidental operation of the members controlled thereby is avoided. A branch cable 69a, which connects the cable 69 to the yoke clamps 56, is attached to a bell crank 77 to provide means for operating the yoke clamps 56 independently of the yoke supporting arm 56 and treadle 60.

The bosom clamp 66 above referred to is pivotally secured to the hollow member 43 intermediate the collar clamp 62 and the anchorage 45 and curvingly extends over the collar clamp 62 to the lower central portion of the panel 24 as is best shown in Figures 1 and 14. A relatively light spring 67 exerts a limited lifting and holding force on the clamp 66 and a heavier spring 68 is arranged in opposition to the lighter spring 67. One end of the heavy spring 68 is secured to the bosom clamp 66 and the other end thereof is secured to the arm of a bell crank 70. The other arm of the bell crank 70 is attached to the rod 58, as is clearly shown in Figure 14, whereby operable movement of the rod 58 to depress the collar clamp 62, also rotates the bell crank counterclockwise, as illustrated in Figure 14, thereby shifting the anchorage of the heavy spring 68 to increase the holding force exerted on the bosom clamp 66. The tension of the light spring 67 is sufficient to maintain the bosom clamp 66 in elevated position only after it has been fully elevated. It is to be noted that the lifting effect of the above mentioned cam action of the collar clamp 62 on the bosom clamp 66 will not shift control to the light biasing spring 67.

In the preferred embodiment of the invention the bosom clamp 66 is preferably moved to inoperative or fully raised position manually. This movement is limited by an abutment 72 secured to the upper surface of the hollow member 43. The abutment 72 is designed and positioned to cooperate with a manually releasable pawl 73 to maintain the unit 42 in its elevated position when rotated thereto on its pivot 44.

Positioned beneath the panel and having a portion in the form of a cam 74 extending therethrough is a rotatable lifting element 75. The lifting element 75 comprises a shaft 76 having a crank arm 78 attached thereto. The crank arm 78 is in turn connected by a link 78a to a bell crank 79 pivotally secured to the U-shaped member 23 as is best shown in Figure 9. Rotation of the bell crank 79 causes the shaft 76 to be rotated and this rotation moves the cam 74 against a plate 80 fixed to the bottom of the hollow member 43, whereupon the hollow member 43 is rotated upon its pivot 44 and the abutment member is moved into locking engagement with the pawl 73.

Actuating means for the bell crank 79 is provided in the form of a ratchet 81 which may be mounted upon one of the supporting members 17, as is best shown in Figure 9. Thus upon tilting operation of the U-shaped member 23 to its dotted line position, the bell crank 79 is moved into an activating position. Upon movement of the U-shaped member 23 from this position the bell crank 79 is rotated with the above explained results.

Rotatably positioned within the body 10 is a shaft 82, see Figure 1, which carries a plurality of crank arms 83 and 84. These arms 83 and 84 are fixed to the shaft 82 and are rotatable therewith. Crank arms 83 are joined to connecting links 86 which in turn are operably connected to the U-shaped member 23, as is best shown in Figures 2, 8, and 9, and crank arm 84 is operably connected to the piston rod 87 of a pressure motor 88. Biasing means, as for instance a spring 89, see Figure 1, may be employed to constrain the piston rod 87 toward its retracted position. From the foregoing it will be apparent that upon the admission of pressure to the motor 88 the piston rod 87 thereof is extended thereby rotating the arm 84 which movement rotates the shaft 82 and crank arms 84 and 83 thereby moving the connecting rods 86 from the positions in which they are shown in full lines in Figures 8 and 9, to the positions in which they are shown in dotted lines in Figure 2, whereby the U-shaped member 23 is also moved to its dotted line position. Upon the pressure motor being exhausted the biasing spring 89 functions to reverse the movement of the parts thereby returning them to their original positions. Each crank arm 83 carries an abutment member 91 for adjustably limiting the travel of the joined arms 83 and connecting link 86.

Figure 3:
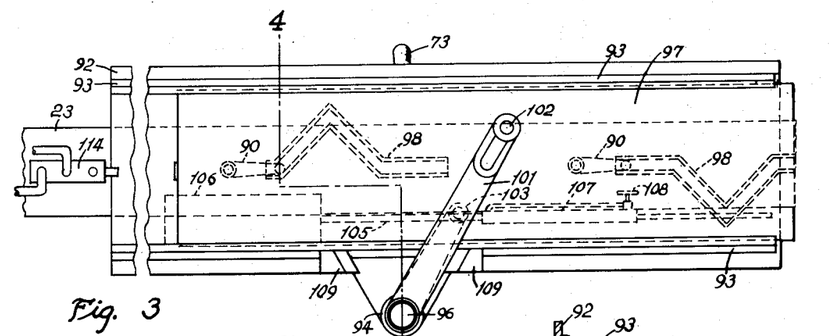
Figure 3 is an elevational view of a fragmental portion of the head or upper end of the apparatus.
Figure 4:
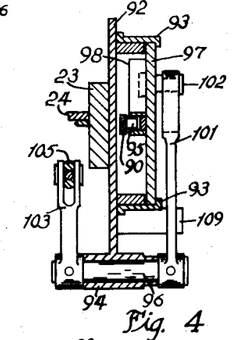
Figure 4 is a section taken on line 4—4 of Figure 3, portions being broken away.

As is best shown in Figures 1, 2 and 3, a supporting plate 92 is suitably secured against the outer surface of the central portion of the U-shaped member 23. The plate 92 is provided with spaced apart rails 93 which parallel the edges of the plate and are substantially coextensive therewith. The intermediate portion of the plate 92 is provided with a pair of apertures through which the extending end portions of operating rods 27 protrude. Fixed to the protruding end of each operating arm 27 is a crank arm 90 to the free end of which a roller 95 is secured. The lower central portion of the plate 92 carries a bearing 94 in which shaft 96 is rotatably positioned. The rails 93 are formed and spaced to provide ways in which an operating plate 97 is slidably positioned. The operating plate 97 which is spaced from the supporting plate 92, as is best shown in Figures 2 and 4, carries on its inner surface a pair of formed channel members 98. The channel members are formed and positioned to receive the rollers 95 attached to crank arms 90 and upon a complete operative movement of the operating plate 97, in either direction, to rotate the cranks 90 and their associated rods 27 approximately 180 degrees in timed sequence.

Figure 5:
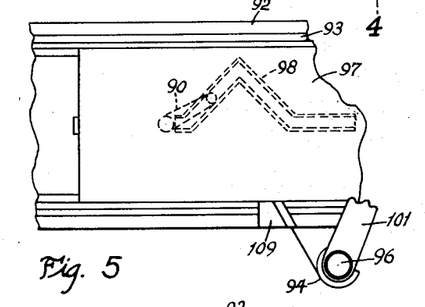
Figures 5, 6 and 7 are fragmental portions of the structure shown in Figure 3 and show different operational positions of the parts.
Figure 6:
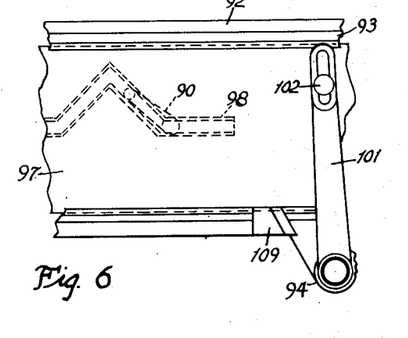
Figure 7:
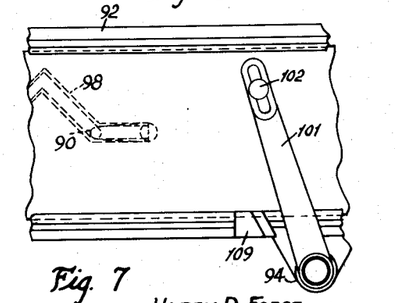

An inspection of Figures 3, 5 and 7, will disclose that as the operating plate 97 is moved toward the left the roller of the left arm 90 ascends the inclined portion of channel member 98 at the left end of the plate 97. Also during the same period of movement of the plate 97 the roller at the free end of the right crank arm 90 follows the horizontal portion of the channel 98 positioned at the right end of the plate 97. Thus in its rotative movement caused by movement of the operating plate 97 to the left, the rotative movement of the right crank arm 90 lags the rotative movement of the left crank arm 90. Upon reverse movement of the operating plate 97 the rotative movement of the left crank arm 90 lags the rotative movement of the right crank arm. Inasmuch as the crank arm 90 and the folding vanes 28 are rigidly fixed to and rotatable with their respective operating rods 27, the operative movement of the folding vanes 28 is also in timed sequence.

As shown in Figures 2 and 4, the ends of the shaft 96 extend beyond the bearing 94 and one end has affixed thereto a crank arm 101 the free end of which is connected, as by a pin 102, to the operating plate 97. A crank arm 103 is also affixed to the opposite extending end of the shaft 94, and the free end of crank arm 103 is operably connected to the piston rod 105 of a pressure motor 106. Connected to the piston rod 105, preferably in alignment therewith, is a liquid displacement timing element 107. The timing element 107 may be adjusted through a hand operated valve 108 to control the rate of operable movement of the pressure motor 106 and the elements driven thereby. Abutment members 109 affixed to the supporting plate 92 and engageable by the crank arm 101 limit the extent of operable movement of the motor 106 and also the extent of movement of the operating plate 97.

Valve means for controlling the operation of motor 88 are connected in series; a first three way valve indicated by the reference numeral 112 is operated by a manually rotated cam 113, and a second three way valve 114 is positioned in the path of travel of the operating plate 97 and is operated by the movement of that member. Valve 112 which for convenience may be attached to one of the supporting elements 17, as shown in Figures 1 and 2, is connected to a supply line 116. As is best shown in Figure 15, the two three way valves 112 and 114 are connected to operate in conjunction to supply operating pressure to motor 88. However under certain conditions the motor 88 may be exhausted through either valve 112 or 114. For this purpose valve 112 is connected to supply line 116 and a conduit 117 extends from valve 112 and extends to valve 114 and flow therethrough may be in either direction. A conduit 118 provides a passage between valve 114 and motor 88 and flow therethrough also may be in either direction. Thus when the stem of valve 114 is depressed, the motor 88 may be exhausted through series connected valve 112. And valve 114 may be operated to exhaust the motor 88 regardless of the position of valve 112.

Two three way valves 120 and 121 are connected to the supply line 116 and have conduits 124 and 125, respectively, extending therefrom to opposed ends of the pressure motor 106. These valves function to alternately supply operating pressure to or exhaust their associated ends of the pressure motor 106. For convenience the valves 120 and 121 are attached to the U-shaped member 23 in opposed relation with an operating cam 122 therebetween, as is best shown in Figure 2. The cam 122 which is provided with an operating land extending along approximately 180 degrees of its periphery is so arranged and located that it may be rotated between its two limit positions and thereby operate either valve 120 or 121 when the U-shaped member 23 is in the position in which it is shown in solid lines in Figure 2. However when the U-shaped member 23 is tilted to its dotted line position rotation of the cam 122 to either limit position will function only to depress the stem of valve 121. Thus if the cam 122 is set in its clockwise limit position, when the U-shaped member 23 is in dotted line position, counterclockwise rotation of the U-shaped member 23 and the valves carried thereby functions automatically to depress the stem of valve 120 and extend the stem of valve 121 as the U-shaped member approaches its counterclockwise or full line limit position.

The cams 113 and 121 are joined for concurrent operations by a connecting link 127 which in turn is connected to a crank arm 128 extending from shaft 129. A second crank arm 130 on the shaft 129 is connected to an operating treadle 132 by suitable link means 133. The arrangement is such that operation of the treadle in one direction concurrently rotates the cams 113 and 122 clockwise and operation of the treadle 132 in the opposite direction concurrently rotates the cams 113 and 122 counterclockwise. Thus the direction of operation of each pressure motor 88 and 106 as well as the timed sequential operation thereof is selectively controlled.

Operation

In folding a previously ironed shirt or like garment on the improved apparatus of this invention the following steps in the order named have given satisfactory results. Assume that the apparatus in unit 42 is held in raised position by engagement of the pawl 73 with the abutment member 72; the folding and clamping vanes 28 and 32, respectively, are extended; operating pressure is being delivered to valve 112 and passing through valve 120 into the pressure motor 106; and the bosom and collar clamps are in raised position. With the apparatus thus prepared, an operator slides the rear upper portion of a shirt to be folded beneath the shirt supporting unit 42 while bringing the front portion of the neck band into overlapping engagement directly in front of the anvil 61. Now the pawl 73 is released and the treadle 60 depressed to thereby rotate the arms 48 of the supporting unit into the position in which they are shown in dotted lines in Figure 1. Concurrently therewith the yoke clamps 56 are raised to admit portions of the shirt thereunder. Now with treadle 60 maintained in depressed position, the treadle 65 is depressed and the cable 71 is drawn taut thereby rotating the collar clamp 62 and clamping the overlapping portions of the neckband against the anvil 61. As this portion of the operations is completed, the lost motion connection comes into play and the attaching arm 57 is engaged and moved by the rod 58 thereby operating the multiple toggle links 54 to expand the collar forming elements 53. Concurrently therewith the anchorage 70 of the spring 68 is moved forward and the bosom clamp 66 is manually positioned on the aligned strip of the shirt. The treadle 65 is maintained in its depressed position by suitable locking means. At this point the treadle 60 is released whereupon the yoke clamps 56 under the influence of their biasing springs 56a depress portions of the yoke into the notches 51 and against the panel 24 and the biasing spring 50 retracts the supporting arms 48 to their substantially parallel positions. The shirt is now secured in aligned and centered folding position by the engagement of the yoke, collar and bosom clamps therewith and also the expansion of the collar forming elements.

When each of the shoulder portions of the shirt resting upon the folding vanes 28 is turned diagonally to bring the sleeves upon the adjacent front portions thereof, the handles 39 are operated to withdraw the detents 36 whereby the clamping vanes 32 are rotated, by the stored energy in the springs 34, into sleeve clamping position. The apparatus and shirt are now substantially in the positions in which they are partially shown in Figure 10.

At this point in the operation the treadle 132 is depressed which movement causes the cams 113 and 122 to be rotated concurrently. This cam movement results in the opening of the pressure sides of valves 121 and 112 and the closing of the exhaust sides thereof. The pressure side of valve 120 is closed and the exhaust side is opened by the same cam movement. Accordingly operating pressure is now delivered to the right end of pressure motor 106, as illustrated in Figure 15 and also to the pressure side of valve 114. The left end of pressure motor 106 as well as pressure motor 88 are connected to atmosphere through the open exhaust sides of valves 120 and 114, respectively. As the piston rod 105 of motor 106 is retracted by the operating pressure entering the right end of the motor, the operably connected operating plate is moved to the left, as illustrated in Figure 3, whereupon the operating rods 27 are rotated thereby rotating the folding and clamping vanes toward the rear of the panel 24. As previously stated this movement of the vanes is carried on in a predetermined sequential order.

The order of sequential operation of the vanes is preferably controlled by the positioning of the channel members 98 so that when the first operating plate has completed a predetermined portion of its operable movement, the rotatable movement of the second operating rod 27 and associated vanes 28 and 32 is started. As the moving vanes approach their destinations the end portions of the operating arms 35 on rods 31 engage the lower surface of the panel 24 whereby the rods are rotated to move the clamping vanes away from the folding vanes 28.

As the operating plate 97 approaches its limit position, the leading end thereof, or a member carried thereby, engages and actuates the valve 114. Now as series connected valve 112 was previously actuated to open position, operating pressure flows from the supply line through valve 112, conduit 117, valve 114, conduit 118 and into the pressure motor 88. As a result of the opening of valve 114 the U-shaped member 23 is tilted to the position in which it is shown in dotted lines in Figures 2, 8 and 9, and the biasing spring 89 is by this action extended.

As the U-shaped member 23 approaches its limit position, and before it engages the abutments 22, the bell crank 77 pivoted to the member 23 engages a supporting element 17 and is rotated thereby. This motion is transmitted through the cable 69a to the yoke clamps 56 which respond by moving to open position. At this time an arm of the bell crank 79 passes the ratchet 81 and comes to rest therebehind in ratchet engaging position as is best shown in dotted lines in Figure 9.

Coincident with the tilting elevation of the U-shaped member 23 the trailing end of the partially folded shirt is drawn over the upwardly projecting portion of the panel 13 which panel may be slightly rotated on its hinge or flexed. In passing over the upper portion of the supporting panel 13 the tail portion of the shirt is creased and aligned with the upper folded portion. This action also starts the transverse folding of the shirt and causes the trailing portion thereof to hang in a substantially vertical plane as the U-shaped member 23 completes its tilting operation. As the apparatus comes to rest in this tilted position it is to be noted that pressure is being applied to the collar expanding and forming members by virtue of the locked treadle 65 and both pressure motors are also energized. Consequently the pressure sides of valves 114 and 121 are maintained in open position and the folding vanes 28 are adjacent the rear surface of the panel 24. Thus with the apparatus and shirt in tilted and folded position an operator may apply a binder, envelope, or the like, to the shirt preparatory to its removal.

However, before attempting to remove the shirt the operator releases the locked treadle 65, whereupon the stored energy in springs 57 and 63 returns the cable 71 and parts actuated thereby to their original positions. In its return movement the collar clamp 62, functioning as a cam, engages the under surface of the bosom clamping member and raises that member sufficiently for the removal of a shirt from the device but not high enough to injure or strain the binder, envelope, or other packaging element thereon. Now as the yoke, collar and bosom clamps have been released, the collar forming members contracted and the clamping vanes rotated into a non-clamping position, the folded and packaged shirt may be readily withdrawn from the device. Following the removal of the packaged shirt the treadle 132 is manually restored to its original position as shown in Figure 15. This operation of the treadle 132 rotates cams 113 and 122 and operates valve 112 to exhausting position. However valves 120 and 121 are not changed by the rotation of cam 122. Upon valve 112 being moved to exhausting position the motor 88 is exhausted and the stored energy in spring 89 functions to rotate the shaft 82 and arms 83 and 84 thereby returning the U-shaped member 23 to its original position.

As the U-shaped member 23 starts its return journey one arm of the bell crank member 79 engages the ratchet 81 and through the linkage and rotatable lifting element 75 rotates the shaft 76 and cam 74 carried thereby which action elevates the shirt alignment and clamping unit 42 to a position in which the pawl 73 engages the abutment 72 and thereby maintains the unit in elevated position. Now as the U-shaped member 23 approaches its destination, the stem of valve 121 passes the end of the elevated land of the cam 122 and is moved to its extended position by its biasing means whereupon the supply of pressure through valve 121 is terminated and the connected right end of motor 106 is exhausted. Concurrently therewith the stem of valve 120 is depressed by engagement with the land of cam 122 so that the exhaust of valve 120 is closed and pressure is supplied to the connected left end of motor 106. Consequently the motor 106 is activated and the resultant movement of the plate 97 rotates the operating rods 27 in their predetermined sequential order whereupon the folding vanes 28 are returned to their original positions. As the folding vanes 28 approach their original positions the operating arms 35 attached to rods 31 engage the detent members 36 and are rotated by such engagement to move the clamping vanes 32 into their original positions as illustrated in Figure 1. Concurrently with the movement of the plate 97 valve 114 is restored to its original position wherein the exhaust side is open and the pressure supply side is closed. Accordingly the cycle of operation is now completed and the apparatus is ready to receive another shirt.

As it will be apparent to those skilled in the art to which the improved apparatus of this invention appertains that numerous changes and widely different embodiments may be made without departing from the spirit and scope thereof, it is intended that the embodiment disclosed herein shall be interpreted as illustrative only and not in a limiting sense. Reference is, therefore, to be had to the appended claims for a definition of the limits of the invention.

We claim:

1. In an apparatus for folding shirts with the front up, a frame, a supporting member pivotally associated with said frame, a shirt supporting and folding panel secured to said supporting member and movable therewith, folding vanes hingedly secured to opposed sides of said panel, shirt clamping means operably associated with each of said folding vanes, means for operating said vanes in timed sequence to fold beneath said panel, and means for concurrently rotating said frame, said panel and said folded vanes between two limit positions.

2. An apparatus for folding shirts with the front up comprising in combination, a supporting frame, a carrying member having parallel spaced apart side portions pivotally associated with said frame and rotatable relative thereto between two limit positions, a shirt supporting and folding panel fixed to said carrying member intermediate and spaced from the two parallel sides thereof, folding vanes hingedly attached to opposed edges of said panel, shirt clamping means operably associated with said folding vanes, a second means actuated by the operation of said first named means for rotating said carrying member to one of its limit positions, collar expanding means positioned above and spaced from the upper surface of said shirt supporting panel, manually actuated means for operating said expanding means, and locking means for maintaining said expanding means in expanded position during the operable movement of said folding vanes and said carrying member.

HARRY D. FORSE.
WILLIAM P. THOMPSON.
LEON T. HOOPER.

References Cited in the file of this patent

UNITED STATES PATENTS

| Number | Name | Date |
|---|---|---|
| 703,110 | Beiermeister | June 24, 1902 |
| 2,152,940 | Wiegman | Apr. 4, 1939 |
| 2,310,555 | Steele | Feb. 9, 1943 |
| 2,362,976 | Cooper | Nov. 21, 1944 |